United States Patent
Wang et al.

(10) Patent No.: US 9,554,304 B2
(45) Date of Patent: *Jan. 24, 2017

(54) SCALABLE MEDIA ACCESS CONTROL FOR MULTI-HOP HIGH BANDWIDTH COMMUNICATIONS

(71) Applicant: OL SECURITY LIMITED LIABILITY COMPANY, Dover, DE (US)

(72) Inventors: Xudong Wang, Kirkland, WA (US); Chao Gui, San Diego, CA (US); Abhishek Patil, San Diego, CA (US); Weilin Wang, San Diego, CA (US); Michael Nova, Del Mar Mesa, CA (US)

(73) Assignee: OL SECURITY LIMITED LIABILITY COMPANY, Dover, DE (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/090,760

(22) Filed: Nov. 26, 2013

(65) Prior Publication Data

US 2014/0092766 A1 Apr. 3, 2014

Related U.S. Application Data

(60) Continuation of application No. 12/950,558, filed on Nov. 19, 2010, now Pat. No. 8,611,320, which is a (Continued)

(51) Int. Cl.
*H04W 4/00* (2009.01)
*H04W 28/24* (2009.01)
(Continued)

(52) U.S. Cl.
CPC .......... *H04W 28/24* (2013.01); *H04L 12/2697* (2013.01); *H04L 12/5695* (2013.01); (Continued)

(58) Field of Classification Search
CPC ...... H04W 40/24; H04W 28/26; H04W 84/18; H04W 72/0406; H04W 72/085; H04W 84/12; H04W 40/02; H04W 74/0816; H04W 40/246; H04W 40/248; H04W 40/12; H04W 48/16; H04W 56/001; H04W 8/005; H04W 92/18; H04L 12/5695; H04L 47/14; H04L 47/829; H04L 45/02; H04L 41/12
(Continued)

(56) References Cited

U.S. PATENT DOCUMENTS 4,706,689 A 11/1987 Man
5,309,437 A 5/1994 Perlman et al.
(Continued)

FOREIGN PATENT DOCUMENTS

JP 2004-304720 10/2004
KR 2004005427 1/2004
(Continued)

OTHER PUBLICATIONS

Ten-Hwang Lai, Dong Zhou, Efficient and scalable IEEE 802.11 Ad-Hoc-Mode Timing Synchronization Function, IEEE Computer Society, 2003, In Proceedings of the 17th Conference on Advanced Information Networking and Applications (AINA '03), pp. 1-6.*
(Continued)

*Primary Examiner* — Olumide T Ajibade Akonai

(57) ABSTRACT

A scalable medium access control ("MAC") module is provided that avoids conflict resource reservation so that network performance does not degrade as the number of hops or nodes in a wireless network increases. The MAC
(Continued)

also provides different access schemes for traffic with different quality of service ("QoS") requirements such that QoS is guaranteed and network resources are efficiently utilized. Furthermore, the resource allocation scheme determines the routing path as resources is allocated for data traffic, thereby achieving more robust layer-2 routing at the MAC layer. Finally, the scalable MAC is compliant with both WiMedia MAC and IEEE 802.15.3 MAC.

20 Claims, 7 Drawing Sheets

Related U.S. Application Data division of application No. 11/462,663, filed on Aug. 4, 2006, now Pat. No. 7,957,356, which is a continuation-in-part of application No. 10/816,481, filed on Apr. 1, 2004, now abandoned, which is a continuation-in-part of application No. 10/437,128, filed on May 13, 2003, now Pat. No. 7,069,483, said application No. 10/816,481 is a continuation-in-part of application No. 10/437,129, filed on May 13, 2003, now abandoned, said application No. 11/462,663 is a continuation-in-part of application No. 11/076,738, filed on Mar. 9, 2005, now abandoned, which is a continuation-in-part of application No. 10/437,129, filed on May 13, 2003, now abandoned, and a continuation-in-part of application No. 10/437,128, filed on May 13, 2003, now Pat. No. 7,069,483, and a continuation-in-part of application No. 10/816,481, filed on Apr. 1, 2004, now abandoned, which is a continuation-in-part of application No. 10/437,129, and a continuation-in-part of application No. 10/437,128, said application No. 11/462,663 is a continuation-in-part of application No. 11/420,668, filed on May 26, 2006, now Pat. No. 7,852,796, and a continuation-in-part of application No. 11/076,738, filed on Mar. 9, 2005, now abandoned.

(60) Provisional application No. 60/380,425, filed on May 13, 2002, provisional application No. 60/747,409, filed on May 16, 2006.

(51) Int. Cl.

| | | |
|---|---|---|
| *H04L 12/26* | (2006.01) | |
| *H04L 12/54* | (2013.01) | |
| *H04L 12/24* | (2006.01) | |
| *H04L 12/733* | (2013.01) | |
| *H04L 12/725* | (2013.01) | |
| *H04L 12/721* | (2013.01) | |
| *H04L 12/801* | (2013.01) | |
| *H04L 12/851* | (2013.01) | |
| *H04L 12/913* | (2013.01) | |
| *H04L 12/923* | (2013.01) | |
| *H04L 12/927* | (2013.01) | |
| *H04L 12/911* | (2013.01) | |
| *H04W 40/24* | (2009.01) | |
| *H04W 72/04* | (2009.01) | |
| *H04W 74/08* | (2009.01) | |
| *H04W 28/08* | (2009.01) | |
| *H04W 28/26* | (2009.01) | |
| *H04W 40/02* | (2009.01) | |
| *H04W 72/08* | (2009.01) | |
| *H04W 76/02* | (2009.01) | |
| *H04W 80/02* | (2009.01) | |
| *H04W 84/18* | (2009.01) | |

(52) U.S. Cl.
CPC ............ *H04L 41/046* (2013.01); *H04L 43/16* (2013.01); *H04L 43/50* (2013.01); *H04L 45/122* (2013.01); *H04L 45/302* (2013.01); *H04L 45/66* (2013.01); *H04L 47/14* (2013.01); *H04L 47/24* (2013.01); *H04L 47/724* (2013.01); *H04L 47/762* (2013.01); *H04L 47/801* (2013.01); *H04L 47/805* (2013.01); *H04L 47/824* (2013.01); *H04L 47/829* (2013.01); *H04W 40/24* (2013.01); *H04W 72/0406* (2013.01); *H04W 74/0816* (2013.01); *H04L 41/12* (2013.01); *H04W 28/08* (2013.01); *H04W 28/26* (2013.01); *H04W 40/02* (2013.01); *H04W 72/085* (2013.01); *H04W 76/027* (2013.01); *H04W 80/02* (2013.01); *H04W 84/18* (2013.01)

(58) Field of Classification Search
USPC ........................................ 455/41.2, 502, 450
See application file for complete search history.

(56) References Cited

U.S. PATENT DOCUMENTS

| | | |
|---|---|---|
| 5,699,355 A | 12/1997 | Natarajan |
| 5,844,905 A | 12/1998 | McKay et al. |
| 5,940,771 A | 8/1999 | Gollnick et al. |
| 5,943,322 A | 8/1999 | Mayor et al. |
| 5,959,999 A | 9/1999 | An |
| 6,003,007 A | 12/1999 | DiRienzo |
| 6,023,563 A | 2/2000 | Shani |
| 6,076,066 A | 6/2000 | DiRienzo et al. |
| 6,122,516 A | 9/2000 | Thompson et al. |
| 6,161,104 A | 12/2000 | Stakutis et al. |
| 6,173,387 B1 | 1/2001 | Baxter et al. |
| 6,199,115 B1 | 3/2001 | DiRienzo |
| 6,208,629 B1 | 3/2001 | Jaszewski et al. |
| 6,226,642 B1 | 5/2001 | Beranek et al. |
| 6,226,684 B1 | 5/2001 | Sung et al. |
| 6,236,662 B1 | 5/2001 | Reilly |
| 6,272,492 B1 | 8/2001 | Kay |
| 6,282,513 B1 | 8/2001 | Strawder |
| 6,289,316 B1 | 9/2001 | Aghili et al. |
| 6,292,596 B1 | 9/2001 | Snyder et al. |
| 6,330,244 B1 | 12/2001 | Swartz et al. |
| 6,331,762 B1 | 12/2001 | Bertness |
| 6,336,114 B1 | 1/2002 | Garrison |
| 6,338,093 B1 | 1/2002 | DiRienzo |
| 6,343,310 B1 | 1/2002 | DiRienzo |
| 6,345,260 B1 | 2/2002 | Cummings et al. |
| 6,349,334 B1 | 2/2002 | Faupel et al. |
| 6,356,992 B1 | 3/2002 | Baxter et al. |
| 6,357,010 B1 | 3/2002 | Viets et al. |
| 6,366,683 B1 | 4/2002 | Langlotz |
| 6,366,912 B1 | 4/2002 | Wallent et al. |
| 6,366,929 B1 | 4/2002 | Dartigues et al. |
| 6,385,730 B2 | 5/2002 | Garrison |
| 6,414,955 B1 | 7/2002 | Clare et al. |
| 6,418,549 B1 | 7/2002 | Ramchandran et al. |
| 6,434,191 B1 | 8/2002 | Agrawal et al. |
| 6,460,128 B1 | 10/2002 | Baxter et al. |
| 6,480,497 B1 | 11/2002 | Flammer et al. |
| 6,526,534 B1 | 2/2003 | Nagoya |
| 6,625,605 B1 | 9/2003 | Terakura et al. |
| 6,628,636 B1 | 9/2003 | Young |
| 6,640,087 B2 | 10/2003 | Reed et al. |
| 6,665,311 B2 | 12/2003 | Kondylis et al. |
| 6,671,840 B1 | 12/2003 | Nagoya |
| 6,687,259 B2 | 2/2004 | Alapuranen |
| 6,694,313 B1 | 2/2004 | Roemer |
| 6,704,321 B1 | 3/2004 | Kamiya |
| 6,754,188 B1 | 6/2004 | Garahi et al. |
| 6,754,499 B1 | 6/2004 | Smith |
| 6,760,877 B1 | 7/2004 | Lappetelainen et al. |
| 6,763,007 B1 | 7/2004 | La Porta et al. |

(56) References Cited

U.S. PATENT DOCUMENTS

| | | |
|---|---|---|
| 6,763,013 B2 | 7/2004 | Kennedy |
| 6,788,702 B1 | 9/2004 | Garcia-Luna-Aceves et al. |
| 6,791,949 B1 | 9/2004 | Ryu et al. |
| 6,795,418 B2 | 9/2004 | Choi |
| 6,807,165 B2 | 10/2004 | Belcea |
| 6,839,541 B2 | 1/2005 | Alzoubi et al. |
| 6,845,084 B2 | 1/2005 | Rangnekar et al. |
| 6,850,502 B1 | 2/2005 | Kagan et al. |
| 6,850,511 B2 | 2/2005 | Kats et al. |
| 6,853,641 B2 | 2/2005 | Lindhorst-Ko et al. |
| 6,865,371 B2 | 3/2005 | Salonidis et al. |
| 6,868,072 B1 | 3/2005 | Lin et al. |
| 6,870,846 B2 | 3/2005 | Cain |
| 6,879,570 B1 | 4/2005 | Choi |
| 6,894,985 B2 | 5/2005 | Billhartz |
| 6,904,021 B2 | 6/2005 | Belcea |
| 6,907,257 B1 | 6/2005 | Mizutani et al. |
| 6,912,215 B1 | 6/2005 | Lin et al. |
| 6,929,721 B2 | 8/2005 | Bifano |
| 6,948,048 B2 | 9/2005 | Baxter et al. |
| 6,950,418 B1 | 9/2005 | Young et al. |
| 6,961,310 B2 | 11/2005 | Cain |
| 6,965,575 B2 | 11/2005 | Srikrishna et al. |
| 6,970,714 B2 | 11/2005 | D'Souza et al. |
| 6,975,613 B1 | 12/2005 | Johansson |
| 6,975,614 B2 | 12/2005 | Kennedy |
| 6,980,524 B1 | 12/2005 | Lu et al. |
| 6,980,810 B1 | 12/2005 | Gerakoulis et al. |
| 6,985,476 B1 | 1/2006 | Elliott et al. |
| 6,986,161 B2 | 1/2006 | Billhartz |
| 6,990,092 B1 | 1/2006 | Siala |
| 6,993,358 B2 | 1/2006 | Shiotsu et al. |
| 7,002,944 B2 | 2/2006 | Kats et al. |
| 7,003,313 B2 | 2/2006 | Garces et al. |
| 7,007,102 B2 | 2/2006 | Billhartz et al. |
| 7,016,328 B2 | 3/2006 | Chari et al. |
| 7,027,426 B2 | 4/2006 | Billhartz |
| 7,031,293 B1 | 4/2006 | Srikrishna et al. |
| 7,035,207 B2 | 4/2006 | Winter et al. |
| 7,046,639 B2 | 5/2006 | Garcia-Luna-Aceves et al. |
| 7,046,649 B2 | 5/2006 | Awater et al. |
| 7,047,473 B2 | 5/2006 | Hwang et al. |
| 7,050,806 B2 | 5/2006 | Garces et al. |
| 7,050,819 B2 | 5/2006 | Schwengler et al. |
| 7,053,770 B2 | 5/2006 | Ratiu et al. |
| 7,054,126 B2 | 5/2006 | Strutt et al. |
| 7,058,021 B2 | 6/2006 | Srikrishna et al. |
| 7,061,895 B1 | 6/2006 | Habetha |
| 7,062,286 B2 | 6/2006 | Grivas et al. |
| 7,069,483 B2 | 6/2006 | Gillies et al. |
| 7,075,414 B2 | 7/2006 | Giannini et al. |
| 7,082,111 B2 | 7/2006 | Amouris |
| 7,082,115 B2 | 7/2006 | Bauer et al. |
| 7,089,066 B2 | 8/2006 | Hesse et al. |
| 7,091,852 B2 | 8/2006 | Mason et al. |
| 7,095,732 B1 | 8/2006 | Watson, Jr. |
| 7,116,983 B2 | 10/2006 | Lan et al. |
| 7,120,126 B2 | 10/2006 | Odman et al. |
| 7,133,398 B2 | 11/2006 | Allen et al. |
| 7,139,336 B2 | 11/2006 | Nefedov |
| 7,151,224 B2 | 12/2006 | Kogure et al. |
| 7,164,671 B2 | 1/2007 | Del Prado et al. |
| 7,200,112 B2 | 4/2007 | Sundar et al. |
| 7,233,584 B2 | 6/2007 | Nguyen et al. |
| 7,245,947 B2 | 7/2007 | Salokannel et al. |
| 7,251,224 B2 | 7/2007 | Ades et al. |
| 7,269,198 B1 | 9/2007 | Elliott et al. |
| 7,280,517 B2 | 10/2007 | Benveniste |
| 7,280,555 B2 | 10/2007 | Stanforth et al. |
| 7,310,958 B2 | 12/2007 | Carter et al. |
| 7,313,398 B1 | 12/2007 | Ramahi |
| 7,324,824 B2 | 1/2008 | Smith et al. |
| 7,376,099 B2 | 5/2008 | Tseng et al. |
| 7,379,447 B2 | 5/2008 | Dunagan et al. |
| 7,388,849 B2 | 6/2008 | Kim et al. |
| 7,395,073 B2 | 7/2008 | Gwon et al. |
| 7,418,523 B2 | 8/2008 | Pettyjohn et al. |
| 7,428,523 B2 | 9/2008 | Tsang et al. |
| 7,451,365 B2 | 11/2008 | Wang et al. |
| 7,496,059 B2 | 2/2009 | Yoon |
| 7,512,074 B2 | 3/2009 | Strutt et al. |
| 7,522,537 B2 | 4/2009 | Joshi |
| 7,609,641 B2 | 10/2009 | Strutt et al. |
| 7,688,808 B2 | 3/2010 | Ren et al. |
| 7,701,858 B2 | 4/2010 | Werb et al. |
| 7,720,016 B2 | 5/2010 | Tsang et al. |
| 2003/0126291 A1 | 7/2003 | Wang et al. |
| 2003/0142624 A1 | 7/2003 | Chiussi et al. |
| 2003/0157951 A1 | 8/2003 | Hasty, Jr. |
| 2003/0161268 A1 | 8/2003 | Larsson et al. |
| 2003/0179742 A1 | 9/2003 | Ogier et al. |
| 2003/0193908 A1 | 10/2003 | Cain |
| 2003/0202524 A1 | 10/2003 | Conner et al. |
| 2003/0212821 A1 | 11/2003 | Gillies et al. |
| 2003/0212941 A1 | 11/2003 | Gillies et al. |
| 2003/0224787 A1 | 12/2003 | Gandolfo |
| 2004/0109428 A1 | 6/2004 | Krishnamurthy |
| 2004/0147223 A1 | 7/2004 | Cho |
| 2004/0152416 A1 | 8/2004 | Dahl |
| 2004/0192713 A1 | 9/2004 | Nisnevich et al. |
| 2004/0198375 A1 | 10/2004 | Schwengler et al. |
| 2004/0204084 A1 | 10/2004 | Tan et al. |
| 2004/0225966 A1 | 11/2004 | Besharat et al. |
| 2005/0002366 A1 | 1/2005 | Toskala et al. |
| 2005/0022175 A1 | 1/2005 | Sliger et al. |
| 2005/0026621 A1 | 2/2005 | Febvre et al. |
| 2005/0090266 A1 | 4/2005 | Sheynblat |
| 2005/0111475 A1 | 5/2005 | Borkowski et al. |
| 2005/0141453 A1 | 6/2005 | Zhu |
| 2005/0190770 A1 | 9/2005 | Saniee et al. |
| 2005/0201315 A1 | 9/2005 | Lakkis |
| 2005/0201340 A1 | 9/2005 | Wang et al. |
| 2005/0201346 A1 | 9/2005 | Wang et al. |
| 2005/0221752 A1 | 10/2005 | Jamieson et al. |
| 2005/0232179 A1 | 10/2005 | DaCosta et al. |
| 2005/0265324 A1 | 12/2005 | Wen et al. |
| 2006/0013398 A1* | 1/2006 | Halasz et al. .......... 380/273 |
| 2006/0104205 A1 | 5/2006 | Strutt et al. |
| 2006/0104292 A1 | 5/2006 | Gupta et al. |
| 2006/0128376 A1 | 6/2006 | Alexis |
| 2006/0128402 A1 | 6/2006 | Lee et al. |
| 2006/0182142 A1 | 8/2006 | Schmidt |
| 2006/0198339 A1 | 9/2006 | Marinier et al. |
| 2006/0215583 A1 | 9/2006 | Castagnoli |
| 2006/0215593 A1 | 9/2006 | Wang et al. |
| 2006/0240843 A1 | 10/2006 | Spain et al. |
| 2006/0253747 A1 | 11/2006 | Gillies et al. |
| 2006/0268908 A1 | 11/2006 | Wang et al. |
| 2007/0049329 A1 | 3/2007 | Mayer et al. |
| 2007/0049342 A1 | 3/2007 | Mayer et al. |
| 2007/0076673 A1 | 4/2007 | Joshi |
| 2007/0076697 A1 | 4/2007 | Huotari et al. |
| 2007/0104215 A1 | 5/2007 | Wang et al. |
| 2007/0110102 A1 | 5/2007 | Yagyuu et al. |
| 2007/0159991 A1 | 7/2007 | Noonan et al. |
| 2007/0201421 A1 | 8/2007 | Huseth |
| 2007/0211682 A1 | 9/2007 | Kim et al. |
| 2007/0230447 A1 | 10/2007 | Hahn et al. |
| 2007/0247367 A1 | 10/2007 | Anjum et al. |
| 2007/0247368 A1 | 10/2007 | Wu |
| 2007/0258508 A1 | 11/2007 | Werb et al. |
| 2007/0294226 A1 | 12/2007 | Chahal et al. |
| 2008/0031169 A1 | 2/2008 | Shi et al. |
| 2008/0032705 A1 | 2/2008 | Patel et al. |
| 2008/0037723 A1 | 2/2008 | Milstein et al. |
| 2008/0069071 A1 | 3/2008 | Tang |
| 2008/0080378 A1 | 4/2008 | Kim et al. |
| 2008/0192713 A1 | 8/2008 | Mighani et al. |
| 2008/0259895 A1 | 10/2008 | Habetha et al. |
| 2009/0073924 A1 | 3/2009 | Chou |

(56) References Cited

U.S. PATENT DOCUMENTS

FOREIGN PATENT DOCUMENTS

| WO | WO-2004/104722 | 12/2004 |
| WO | WO-2004/104850 | 12/2004 |
| WO | WO-2007/143554 | 12/2007 |
| WO | WO-2008/070871 | 6/2008 |

OTHER PUBLICATIONS

Alicherry, Mansoor et al., "Joint Channel Assignment and Routing for Throughput Optimization in Multi-radio Wireless Mesh Networks," MobiHoc'05, pp. 58-72 (Aug. 28-Sep. 2, 2005).

Bahl, Paramvir et al., "SSCH: Slotted Seeded Channel Hopping for Capacity Improvement in IEEE 802.11 Ad-Hoc Wireless Networks," MobiCom'04, pp. 216-230 (Sep. 26-Oct. 1, 2004).

Bao et al., "Collision-Free Topology-Dependent Channel Access Scheduling," Oct. 22, 2000-Oct. 25, 2000, MILCOM 2000. 21st Century Military Communication Conference Proceedings, vol. 1, pp. 507-511.

Bao et al., "Distributed dynamic access scheduling for ad hoc networks," Journal of Parallel and Distributed Computing, Apr. 13, 2003, Elsevier Science, vol. 63, Issue 1, pp. 3-14.

Final Office Action on U.S. Appl. No. 11/420,668, mailed May 26, 2009.

International Preliminary Examination Report on PCT/US03/34799, completed Jan. 6, 2005.

International Preliminary Examination Report on PCT/US03/34884, completed Feb. 7, 2005.

International Preliminary Report on Patentability for PCT/US2007/069031, issued Nov. 17, 2008.

International Search Report for PCT/US03/34884, mailed Nov. 30, 2004.

International Search Report on PCT/US03/34799, mailed Oct. 12, 2004.

Kodialam, Murali et al., "Characterizing Achievable Rates in Multi-Hop Wireless Mesh Networks With Orthogonal Channels," IEEE/ACM Transactions on Networking, 13(4):868-880 (Aug. 2005).

Kodialam, Murali et al., "Characterizing the Capacity Region in Multi-Radio Multi-Channel Wireless Mesh Networks," MobiCom'05, pp. 73-87 (Aug. 28-Sep. 2, 2005).

Mishra, Arunesh et al., "Weighted Coloring based Channel Assignment for WLANs," Mobile Computing and Communications Review, 9(3):19-31 (2005).

Non-Final Office Action on U.S. Appl. No. 10/437,128, mailed Dec. 6, 2005.

Non-Final Office Action on U.S. Appl. No. 10/437,128, mailed Aug. 24, 2004.

Non-Final Office Action on U.S. Appl. No. 10/437,129, mailed Oct. 10, 2007.

Non-Final Office Action on U.S. Appl. No. 10/437,129, mailed Dec. 29, 2006.

Non-Final Office Action on U.S. Appl. No. 10/816,481, mailed Jan. 9, 2008.

Non-Final Office Action on U.S. Appl. No. 11/420,668, mailed Oct. 28, 2009.

Non-Final Office Action on U.S. Appl. No. 11/420,668, mailed Nov. 14, 2008.

Non-Final Office Action on U.S. Appl. No. 11/421,998, mailed Dec. 2, 2008.

Non-Final Office Action on U.S. Appl. No. 11/615,582, mailed Mar. 26, 2010.

Non-Final Office Action on U.S. Appl. No. 11/615,582, mailed Jul. 21, 2010.

Non-Final Office Action on U.S. Appl. No. 11/741,637, mailed Dec. 16, 2011.

Non-Final Office Action on U.S. Appl. No. 11/741,637, mailed Aug. 20, 2013.

Non-Final Office Action on U.S. Appl. No. 11/425,114, mailed Sep. 19, 2007.

Non-Final Office action on U.S. Appl. No. 11/615,582, mailed Nov. 17, 2009.

Non-Final Office Action on U.S. Appl. No. 11/421,998, mailed Oct. 30, 2009.

Notice of Allowance on U.S. Appl. No. 11/421,998, mailed Jul. 12, 2010.

Notice of Allowance on U.S. Appl. No. 11/615,582, mailed Jan. 6, 2011.

Notice of Allowance on U.S. Appl. No. 11/741,630, mailed Dec. 27, 2011.

Notice of Allowance on U.S. Appl. No. 11/741,637, mailed Jul. 30, 2012.

Notice of Allowance on U.S. Appl. No. 11/741,637, mailed Jan. 14, 2014.

Notice of Allowance on U.S. Appl. No. 12/950,558, mailed Aug. 20, 2013.

Notice of Allowance on U.S. Appl. No. 11/420,668, mailed Apr. 26, 2010.

Ramachandran, Krishna N. et al., "Interference-Aware Channel Assignment in Multi-Radio Wireless Mesh Networks," Proceedings IEEE Infocom, pp. 1-12 (Apr. 2006).

Raman, Bhaskaran, "Channel Allocation in 802.11-based Mesh Networks," Proceedings IEEE Infocom, pp. 1-10 (2006).

Raniwala, Ashish et al., "Architecture and Algorithms for an IEEE 802.11-Based Multi-Channel Wireless Mesh Network," IEEE, 2223-2234 (2005).

Raniwala, Ashish et al., "Centralized Channel Assignment and Routing Algorithms for Multi-Channel Wireless Mesh Networks," Mobile Computing and Communications Review, 8(2):50-65 (2004).

So, Jungmin et al., "Multi-Channel MAC for Ad Hoc Networks: Handling Multi-Channel Hidden Terminals Using a Single Transceiver," MobiHoc'04, pp. 222-233 (May 24-26, 2004).

Tang et al., "A Protocol for Topology-Dependent Transmission Scheduling in Wireless Networks," IEEE Wireless Communication and Networking Conference 1999 (WCNC '99), p. 1333-1337 Sep. 1999.

Tang et al., "Hop Reservation Multiple Access (HRMA) for Multichannel Packet Radio Networks," IEEE Computer Communications Networks, 1998 Proceedings, 7th International Conference, p. 388-395, Oct. 12-15, 1998.

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77.

\* cited by examiner

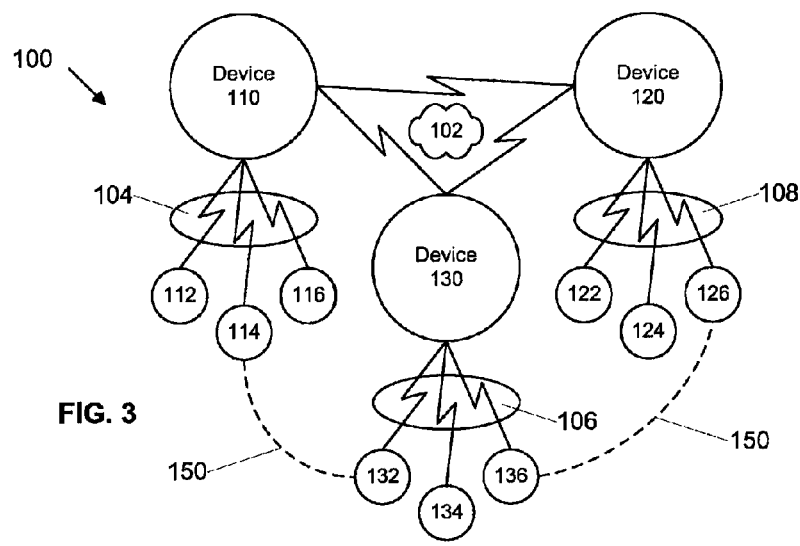
FIG. 3
| DEST | NEXT HOP | HOPS | CHANNEL | POWER |
|------|----------|------|---------|-------|
| 112  | X        | 0    | 11      | 1/8   |
| 122  | 110      | 2    | 6       | 1/8   |
| 132  | 110      | 2    | 1       | 1/4   |
FIG. 4
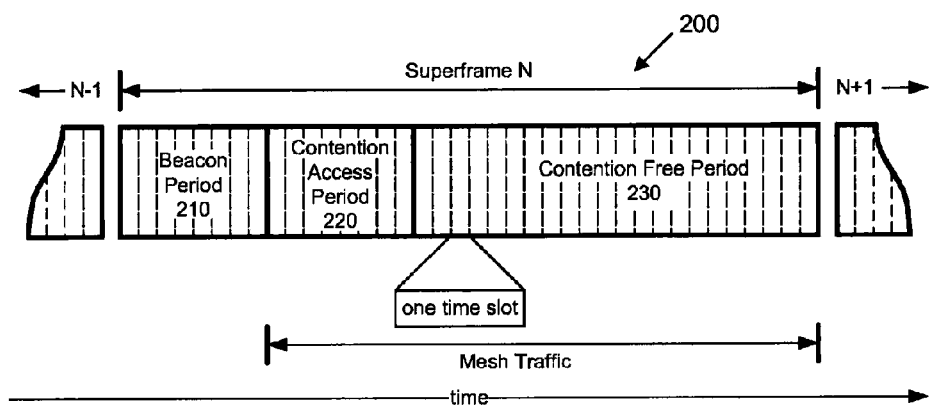
FIG. 5

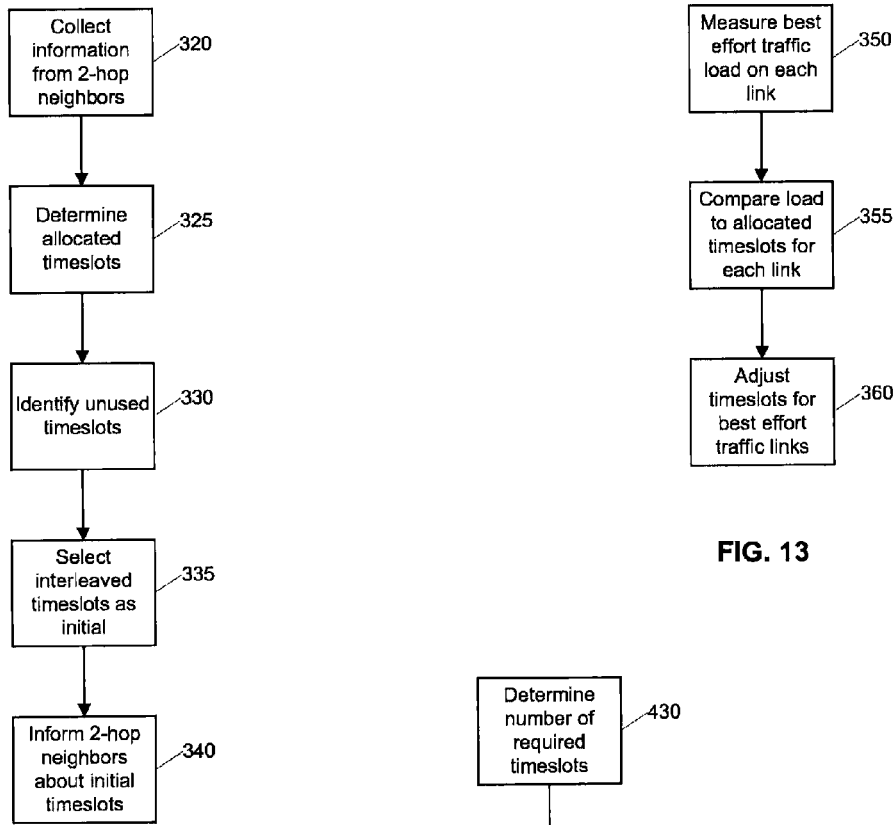
FIG. 12
FIG. 13
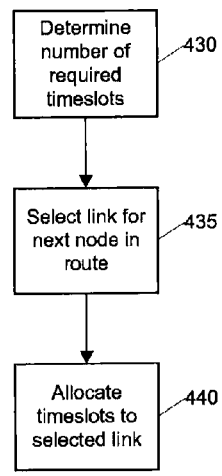
FIG. 15

SCALABLE MEDIA ACCESS CONTROL FOR MULTI-HOP HIGH BANDWIDTH COMMUNICATIONS

CROSS-REFERENCE TO RELATED PATENT APPLICATIONS

This application is a Continuation of U.S. application Ser. No. 12/950,558, filed Nov. 19, 2010, which is a Divisional of U.S. application Ser. No. 11/462,663, filed Aug. 4, 2006, which is a Continuation-in-Part of U.S. application Ser. No. 10/816,481, filed Apr. 1, 2004, which is a Continuation-in-Part of U.S. application Ser. No. 10/437,128 and 10/437,129 filed May 13, 2003, which both claim the benefit of U.S. Provisional 60/380,425, filed May 13, 2002; and U.S. application Ser. No. 11/462,663 is a Continuation-in-Part of U.S. application Ser. No. 11/076,738 filed Mar. 9, 2005, which is a Continuation-in-Part of U.S. application Ser. No. 10/816,481, filed Apr. 1, 2004, which is a Continuation-in-Part of U.S. application Ser. No. 10/437,128 and 10/437,129 filed May 13, 2003, which both claim the benefit of U.S. Provisional 60/380,425, filed May 13, 2002; U.S. application Ser. No. 11/076,738 is also a Continuation-in-Part of U.S. application Ser. No. 10/437,128 and 10/437,129, filed May 13, 2003, which both claim the benefit of U.S. Provisional 60/380,425, filed May 13, 2002; U.S. application Ser. No. 11/462,663 is a Continuation-in-Part of U.S. application Ser. No. 11/420,668, filed on May 26, 2006, which claims the benefit of U.S. Provisional 60/747,409, filed May 16, 2006, and U.S. application Ser. No. 11/420,668 is a Continuation-in-Part of U.S. application Ser. No. 11/076,738 filed Mar. 9, 2005, which is a Continuation-in-Part of U.S. application Ser. No. 10/816,481, filed Apr. 1, 2004, which is a Continuation-in-Part of U.S. application Ser. Nos. 10/437,128 and 10/437,129, filed May 13, 2013, which both claim the benefit of U.S. Provisional 60/380,425; U.S. application Ser. No. 11/076,738 is also a Continuation-in-Part of U.S. application Ser. No. 10/437,128 and 10/437,129, filed May 13, 2013, which both claim the benefit of U.S. Provisional 60/380,425, filed May 13, 2002, each of which is incorporated herein by reference in its entirety.

BACKGROUND

The present disclosure is generally related to wireless communications and more particularly related to a scalable medium access control ("MAC") module for use in multi-hop wireless network communications over high bandwidth wireless communication channels based on ultra-wide band ("UWB") or orthogonal frequency division multiplexing ("OFDM") among others.

RELATED ART

In recent times, UWB technology has gone through significant progress. Many different competing proposals for UWB networking have been consolidated into two major camps. The first proposal falls under the WiMedia umbrella and is backed by companies including Intel, Microsoft, and Phillips, among others. The second proposal falls under the UWB Forum umbrella and is backed by Motorola, Freescale, among other companies.

UWB communication technologies hold out the promise of high speed transmission rates over short distances. However, to extend the coverage of UWB networks without compromising the high speed transmission rates, a wireless mesh network is needed. Additionally, by using mesh networking to extend UWB coverage, the network reliability and fault tolerance of UWB networks can advantageously be improved.

The conventional medium access control ("MAC") protocols of UWB networks, in particular, IEEE 802.15.3 MAC and WiMedia MAC (including the multi-band OFDM alliance ("MBOA") MAC) can also support mesh networking, the performance of these conventional MAC solutions lacks scalability in a multi-hop mesh network environment.

Additionally, no single UWB communication solution has taken hold in the industry. For example, the physical layer of WiMedia is based on the MBOA ("MBOA-UWB") or multi-band OFDM UWB while the physical layer of the UWB Forum is based on direct sequence UWB ("DS-UWB"). The major difference between MBOA-UWB and DS-UWB is that MBOA-UWB splits the entire UWB spectrum into several bands during which orthogonal frequency division multiplexing ("OFDM") is used.

In addition to these physical layer differences, the MAC layer is also different for these competing UWB technologies. The WiMedia MAC, as defined in ECMA-368 [1], consists of both CSMA/CA in the prioritized contention access ("PCA") period and time division multiple access ("TDMA") in the contention free period. A superframe in the MAC defined by the UWB Forum, as specified in IEEE 802.15.3 [2], consists of a contention access period ("CAP") and channel time allocation period ("CTAP"). In CAP, CSMA/CA is used, while slotted Aloha and TDMA are used in the CTAP.

Another major difference in the MAC of these two proposals lies in the formation of their respective network topologies. Under the IEEE 802.15.3 approach, nodes within communication range of each other are organized into a piconet, which is managed under a piconet coordinator ("PNC"). The disadvantage of this approach is that no specification is available for multi-hop networks.

In contrast, under the WiMedia approach, nodes using the same beacon period ("BP") are organized into a single distributed peer-to-peer network and the WiMedia MAC uses a fully distributed protocol with no central point of control or coordinator. When two networks with different BPs come within range of each other, merging of the BPs is necessary. Once this is done, the individual peer-to-peer networks become a multi-hop distributed network.

Although both the IEEE 802.15.3 MAC and the WiMedia MAC can be extended to support multi-hop wireless networking among devices, the performance of these types of multi-hop networks is not scalable and fails to achieve some of the primary goals of wireless mesh networking.

Specifically, under the IEEE 802.15.3 MAC approach, there is no solution for internetworking of piconets. Thus, the IEEE 802.15.3 completely fails to describe how a mesh network can be formed from piconets. As a result, no multi-hop performance information is provided either.

Additionally, under the IEEE 802.15.3 MAC approach, no resource allocation for a mesh network is even contemplated. The described allocation scheme for piconet is not applicable to a multi-hop mesh network.

Finally, under the IEEE 802.15.3 MAC approach, an individual piconet is under centralized control of the PNC. One significant drawback of this scheme is that when a network size is large, this scheme is not scalable and easily fails. Although the centralized control of the PNC can be passed from one node to another, such passing causes a significant amount of overhead and proves to be too slow to meet the requirements of high speed networking.

Under the WiMedia MAC approach, a mesh network is formed by merging different groups of peer-to-peer networks with different BPs. However, resource allocation between groups being merged can be in conflict. The resulting requirement of resolving such conflicts also proves to be too slow and non-convergent.

Additionally, under the WiMedia MAC approach, distributed resource allocation is only carried out locally and no end-to-end resource allocation solution is contemplated. As a result, there is a significant increase in communication errors because the routing protocol may unknowingly select a routing path without enough resources. Therefore, what is needed is a system and method that overcomes these significant problems found in the conventional systems as described above.

SUMMARY

Accordingly, described herein are systems and methods employing an improved MAC that avoids conflict resource reservation so that the network performance will not degrade as the number of hops or nodes increases. The scalable MAC also provides different access schemes for traffic flows with different quality of service ("QoS") requirements such that QoS is guaranteed and network resources are efficiently utilized. Additionally, a resource allocation scheme is provided and employed by the MAC that dynamically determines the routing path as resources are allocated for data traffic, resulting in more robust communications due to layer-2 routing being incorporated into the MAC protocol. Finally, the scalable MAC is compliant with both WiMedia MAC and IEEE 802.15.3 MAC to allow for seamless adoption by the industry.

The MAC is scalable because the resource allocation scheme is distributed and achieves high channel spatial-reuse efficiency without conflict allocation and because the resource allocation is performed together with routing which achieves layer-2 routing within the MAC protocol and thereby ensures optimal performance in both routing and the MAC layer. Additionally, the resource allocation scheme improves QoS support for traffic requiring a certain level of reliability such as real-time multimedia.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 is a network diagram illustrating an example wireless network with a hybrid topology according to an embodiment of the present invention;

FIG. 4 is a block diagram illustrating an example neighbor list according to an embodiment of the present invention;

FIG. 5 is a block diagram illustrating an example MAC protocol superframe according to an embodiment of the present invention;

FIG. 12 is a flow diagram illustrating an example process for allocating initial timeslots in a wireless network according to an embodiment of the present invention;

FIG. 13 is a flow diagram illustrating an example process for allocating resources for best effort wireless communication according to an embodiment of the present invention;

FIG. 15 is a flow diagram illustrating an example process for resource reservation according to an embodiment of the present invention;

DETAILED DESCRIPTION OF THE PREFERRED EMBODIMENTS

Certain embodiments as disclosed herein provide for a MAC module that is configured to be deployed in a wireless communication device to facilitate multi-hop wireless network communications over high bandwidth wireless communication channels based on UWB, OFDM, 802.11/a/b/g, among others. In one embodiment, the nodes involved in the multi-hop wireless communications are arranged in a mesh network topology. For example, one method as disclosed herein allows for the MAC module to determine the network topology by parsing beacon signals received from neighbor nodes within communication range and establish high bandwidth communication links with those nodes that are within range to provide a signal quality that supports high bandwidth communication. For applications that require a certain level of quality of service, the methods herein provide for establishing a multi-hop end-to-end route over the mesh network where each link in the route provides the necessary level of signal quality.

After reading this description it will become apparent to one skilled in the art how to implement the invention in various alternative embodiments and alternative applications. To facilitate a direct explanation of the invention, the present description will focus on an embodiment where communication is carried out over a UWB network, although the invention may be applied in alternative networks including 802.11, 802.15, 802.16, worldwide interoperability for microwave access ("WiMAX") network, wireless fidelity ("WiFi") network, wireless cellular network (e.g., wireless wide area network ("WAN"), Piconet, ZigBee, IUP multimedia subsystem ("IMS"), unlicensed module access ("DMA"), generic access network ("GAN"), and/or any other wireless communication network topology or protocol. Additionally, the described embodiment will also focus on a single radio embodiment although multi-radio embodiments and other multiple input multiple output ("MIMO") embodiments are certainly contemplated by the broad scope of the present invention. Therefore, it should be understood that the embodiment described herein is presented by way of example only, and not limitation. As such, this detailed description should not be construed to limit the scope or breadth of the present invention as set forth in the appended claims.

Figure 1:
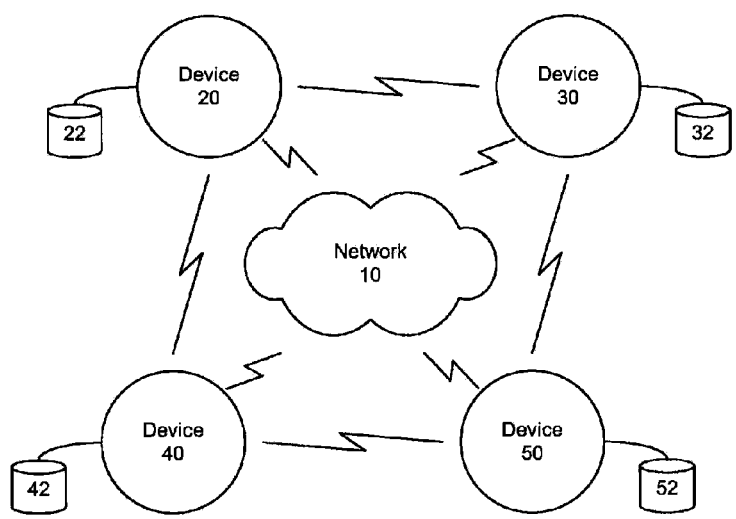
FIG. 1 is a network diagram illustrating an example wireless network with a mesh topology according to an embodiment of the present invention.

FIG. 1 is a network diagram illustrating an example wireless network 10 with a mesh topology according to an embodiment of the present invention. In the illustrated embodiment, the network 10 comprises four wireless communication device (also referred to herein as "nodes"), namely devices 20, 30, 40, and 50. Each node is configured with a data storage area, namely data storage areas 22, 32, 42, and 52. Each of the devices is in wireless communication range with one or more other devices in the network 10.

The network 10 can be a personal area network ("PAN"), local area network ("LAN"), wide area network ("WAN"), or a distributed combination of networks collectively comprising a global communications network such as the Internet. Network 10 can be fixed in location, mobile, or may comprise a combination of fixed and mobile components. Additionally, network 10 may carry communications corresponding to a single network protocol or to multiple network protocols. For example, network 10 may be a UWB network for carrying high bandwidth wireless traffic. In one embodiment, the network 10 may be a UWB network organized in a peer-to-peer topology, a star network topology, a mesh network topology, a piconet topology, or any other sort of network topology. Additionally, the network 10 may periodically and dynamically change from one topology to another topology as wireless nodes change relative locations. In an alternative embodiment, the network 10 may also be a wired network.

Furthermore, the network 10 may be employed to implement any of a variety of applications. Advantageously, the network 10 is configurable for high bandwidth traffic so the types of applications that can run over the network 10 are not limited and include, for example, applications such as: data, voice, video, triple-play, multimedia, high definition video, VOIP, video conferencing, video games, multi-player video games with piggy-backed VOIP, general internet browsing, and client-server applications, just to name a few.

In this detailed description, a wireless communication device such as device 20 may also be referred to as a network device, device, network node, node, wireless device, or wireless node. Although various names may be used herein, a wireless device may comprise all or a minimal subset of the components and functional capabilities described herein, fore example those features described with respect to FIGS. 6-9, 16 and 17.

Notably, the wireless communication devices such as device 20 can be any of a variety of wireless communication devices including but not limited to a laptop computer, cell phone, personal digital assistant ("PDA"), game console, wireless TV set and set-top box, radio frequency identification (RFID) device, or any of a variety of stationary or mobile devices with which communication is desirable.

Additionally illustrated in FIG. 1 are several wireless communication links (not labeled) between the various nodes. In one embodiment, a plurality of links together comprise a path between the two terminal nodes.

Figure 2:
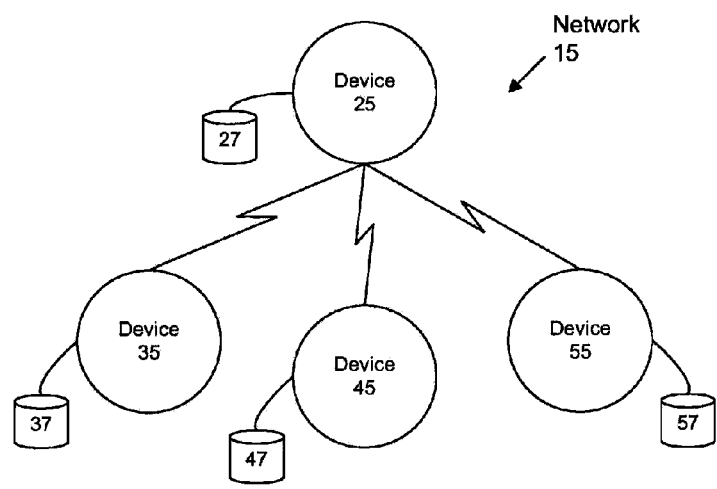
FIG. 2 is a network diagram illustrating an example wireless network with a piconet topology according to an embodiment of the present invention.

FIG. 2 is a network diagram illustrating an example wireless network 15 with a piconet topology according to an embodiment of the present invention. In the illustrated embodiment, the piconet 15 comprises nodes 25, 35, 45, and 55. Each node is configured with a data storage area, namely data storage areas 27, 37, 47, and 57. As will be understood by those having skill in the art, node 25 is considered the piconet controller ("PNC") and is responsible for maintaining communications between all of the nodes in the network 15. In one embodiment, the piconet 15 operates in accordance with the IEEE 802.15.3 standard and may employ Bluetooth or other communication links between the various nodes in the piconet 15.

FIG. 3 is a network diagram illustrating an example wireless network 100 with a hybrid topology according to an embodiment of the present invention. In the illustrated embodiment, the network 100 comprises a mesh network 102 between nodes 110, 120, and 130. These nodes cooperatively communicate with each other and various other nodes to provide a dynamic wireless communication network 100 that enables each node to communicate directly or indirectly with each other.

Additionally, the illustrated embodiment comprises piconet networks 104, 106, and 108. Piconet 102 comprises nodes 110 as the PNC and nodes 112, 114, and 116. Similarly, the PNC for piconet 106 is node 130 and its other member nodes are 132, 134, and 136. The PNC for piconet 108 is node 120 and its other member nodes are 122, 124, and 126. Although not shown, each node in the figure can be configured with a data storage area.

Also illustrated are optional communication links 150 that provide direct communication between member nodes of different piconets. Although not shown in FIG. 3, there may be multi-hop routes between nodes that are in a single piconet. For example, a node 113 (not illustrated) may be in communication solely with node 112 and thereby be included in piconet 104 and accessible via a communication path including more than one hop.

In alternative embodiments, disparate network topologies other than piconets and mesh networks may be merged into a single wireless network such as network 100. Advantageously, the nodes in these disparate topologies can employ the MAC module described herein to facilitate high bandwidth communications by forming a mesh network or employing the communication capabilities of the MAC module within existing topologies.

In an alternative embodiment, nodes using different broadband wireless communication technologies may be merged into a single wireless network such as network 100. For example, node 112 may be a UWB device, node 122 may be a WiFi device, and node 132 may be a WiMAX device. It is anticipated that such different wireless communication technologies will overlap in their use of frequency in the future and as such, various nodes employing different technologies may cause interference with each other. Accordingly, integrating the various nodes using different technologies into a single network 100 precludes frequency interference by providing a common communication framework over the various frequencies, channels, and timeslots employed the various devices. The single network 100 additionally provides the advantage of allowing all of the nodes using different broadband wireless communication technologies to communicate with each other.

For example, UWB radios are expected to use all frequency bands from 3.1 GHz up to 10 GHz. These frequency bands overlap with the frequency bands used by WiFi radios and WiMAX radios. Advantageously, the single network 100 allows nodes employing a diverse set of broadband wireless networking technologies to coexist and communicate with each other, successfully meeting the needs of different users and different applications. In one embodiment, nodes 110, 120, and 130 in the hybrid network 100 provide a bridging capability between the different wireless communication technologies through a separate interface for each, such as UWB, WiFi, and WiMAX. Accordingly, a multi-hop path can be formed using WiFi links, UWB links, WiMAX links, or any combination of these and other communication links. Advantageously, the scalable MAC module on each node employs layer-2 routing to identify the appropriate communication technology for each link and uses that as a parameter or property for the link to form a hybrid path that satisfies the QoS requirements of the end-to-end nodes that are in communication with each other, whether using best effort traffic or reliable transmission traffic.

In yet another embodiment, the network 100 comprises networks 102, 104, 106, and 108 and each of these networks is a discrete network. For example, network 104 may be a wireless WAN operated by a carrier while network 106 is a wireless LAN in a home environment. Advantageously, the scalable MAC module allows node 132 to communicate directly with node 114 if the two nodes are in proximity of each other.

Additionally, node 132 can be a mobile device and thereby when it moves from one location to another the scalable MAC allows node 132 to roam between the wireless LAN 106 and the wireless WAN 104. The roaming between network 106 and network 104 may be accomplished through beaconing with a node in network 104 when node 132 comes into proximity with such a node. The roaming between network 106 and network 104 may also be accomplished through communications with node 110. For example, the network 104 may have an access point topology where each node in the network 104 communicates through the node 110. Such dynamic switching between wireless networks is advantageously facilitated by the scalable MAC module and its use of beaconing to identify its network topology and neighbor list and can be employed between networks with no centralized controller (such as two mesh networks) or networks with a centralized controller (such as a piconet), or any combination of networks with or without a centralized controller.

FIG. 4 is a block diagram illustrating an example neighbor list according to an embodiment of the present invention. Advantageously, a node in a mesh network may maintain a routing table of nodes that it is aware of. The routing table preferably contains useful information such as the number of hops to reach the destination node, the very next hop in the path to reach the destination node, a preferred communication channel for the destination node, and a power level for the destination node. The power level preferably indicates the power level at which to broadcast packets when initiating communications with the recipient node. Additional information may also be included in the neighbor list, for example the signal-to-noise ratio ("SNR"), the signal strength, and other useful information.

In one embodiment, as nodes join a network such as network 100 shown in FIG. 3, the nodes receive beacon signals from the other nodes in the network. A new node can parse the beacon signals and populate its neighbor list accordingly. For example, all of the nodes that send a beacon signal are considered to be neighbor nodes because their beacon signals are within range of the new node. However, some beacon signals that are received may be discarded if the signal strength of the beacon is too low to support high bandwidth communications, for example, UWB communications.

FIG. 5 is a block diagram illustrating an example MAC protocol superframe 200 according to an embodiment of the present invention. In the illustrated embodiment, the superframe 200 comprises a beacon period ("BP") 210, contention access period ("CAP") 220, and a contention free period ("CFP") 230. The portions of the superframe 200 are shown as divided up into a plurality of timeslots. In one embodiment, the number of timeslots in each period is adjustable and controlled by the scalable multi-hop MAC module. Additionally, the length of each individual timeslot can depend on whether the underlying radio is WiMedia or IEEE 802.15.3 based.

One advantage of arranging the superframe into the BP, CAP, and CFP is that this organization is also followed by both the WiMedia MAC and the IEEE 802.15.3 MAC. For example, the superframe 200 allows the use of carrier sense multiple access/collision avoidance ("CSMA/CA") in the CAP combined with the use of TDMA in the CFP. Because the CAP uses CSMA/CA, it is compatible with both WiMedia and IEEE 802.15.3 and the periods can be easily aligned since period timing information is provided in the beacon signals which are analyzed by the scalable MAC module.

Additionally, during the CFP, in order to avoid collisions with nodes employing WiMedia or IEEE 802.15.3, connection setup or tear down messages follow the packet formats defined in WiMedia or IEEE 802.15.3 MAC so that nodes using WiMedia or IEEE 802.15.3 MACs are made aware of the timeslot allocation for nodes using the scalable MAC module and vice versa. Thus, when no timeslot conflicts are present, nodes using the presently described scalable MAC module can communicate with both WiMedia nodes and IEEE 802.15.3 nodes in a UWB or other high bandwidth network.

During the beacon period, signaling messages are passed around among the nodes in the wireless network. Each node sends a beacon signal during this period so that new nodes joining the network can identify the set of neighbor nodes. The beacon signal includes information about the sender node as well as information from its own neighbor list to facilitate the propagation of network topology information to all nodes in the network.

During the contention access period, the nodes in the network collaboratively assign timeslots for communication during the contention free period and identify routes where necessary for reliable end-to-end communications. The assignment of timeslots amongst the nodes is done in an interleaved fashion in order to optimize the use of spectrum amongst all nodes in the network and ensure the highest throughput and quality of service.

During the contention free period, the nodes in the network send and receive data communications during the various timeslots under a TDMA paradigm.

Figure 6:
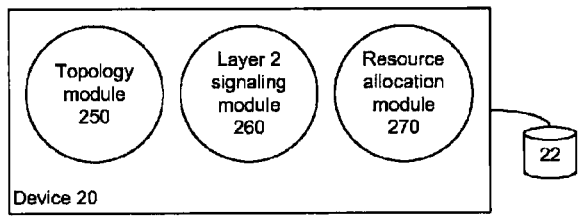
FIG. 6 is a block diagram illustrating an example wireless communication device according to an embodiment of the present invention.

FIG. 6 is a block diagram illustrating an example wireless communication device 20 according to an embodiment of the present invention. In the illustrated embodiment, the node 20 comprises a topology module 250, a layer-2 signaling module 260, and a resource allocation module 270. As previously described, the node 20 can be any sort of wireless communication device.

In one embodiment, the various modules shown in the figure can be incorporated into a MAC module that implements layer-2 communications on a wireless network. Advantageously, the MAC module is scalable because the network topology is formed with links having the best link quality. Accordingly, adding new nodes with high quality links does not introduce decreased performance levels to the network. Additionally, distributed TDMA is guaranteed to have no conflict of resource allocation and layer-2 routing is incorporated into the resource allocation process for both best effort and reliable transmission traffic. Advantageously, the MAC module can be implemented in software for deployment on off-the-shelf UWB chipsets or it can be embedded into the MAC sublayer of the UWB chipsets such that the UWB chipsets are shipped with mesh-ready functionality.

The topology module 250 is configured to align the node's beacon signal with the mesh network. In one embodiment, when a UWB node joins a mesh network, the topology module 250 accomplishes alignment of the node's beacon signal with the mesh network by receiving and analyzing beacon signals from other nodes within wireless communication range and developing and maintaining a neighbor list that describes the current topology of the wireless network. For example, during the beacon period, the topology module 250 may receive five beacon signals. Of the five, perhaps only four are received with sufficient signal quality to be considered a neighbor node. Accordingly, each of the four beacon signals are analyzed by the topology module 250 to identify who the sender node is, what the signal quality is, who the sender node's neighbors are, and other useful information for determining the topology of the wireless network.

One aspect of determining the topology can be described with reference to the discarded fifth beacon signal described above. Since the sender node of that beacon signal is not a direct neighbor, one or more of the four beacon signals with sufficient quality may include the sender of the discarded fifth beacon signal as a neighbor. In such a case, the neighbor list can include the sender of the fifth beacon signal as a multi-hop neighbor with a path (i.e., the node(s) through which communications for the sender of the fifth beacon signal should go) that includes the neighbor with the highest signal strength between it and the sender of the fifth beacon signal. In this fashion, the topology module 250 can identify the various direct and multi-hop nodes within communication range to determine the topology of the wireless network such that high quality high bandwidth communications may take place.

The layer-2 signaling module 260 is configured to send and receive MAC layer control and signaling messages. The layer-2 signaling module 260 also implements optional layer-2 routing. Advantageously, layer-2 signaling and control messages are sent and received in the timeslots in the initial allocation and unicast signaling between nodes is employed by the layer-2 signaling module 260 in order to increase the reliability of signaling and delivery of control messages.

The resource allocation module 270 is configured manage routing for best effort traffic and reliable transmission traffic. In one embodiment, reliable transmission traffic includes data for multimedia applications, for example, audio and video data. Because there are no QoS specifications for best effort traffic, the resource allocation module 270 establishes an end-to-end traffic flow as needed for such traffic. This can be accomplished by setting up a routing path in the MAC layer (i.e., layer-2). Advantageously, resource sharing within neighboring nodes is implemented during resource allocation to provide fair queuing and delivery of best effort traffic.

For reliable transmission traffic, the resource allocation module 270 identifies the QoS requirements and delivery specifications for such traffic and identifies and establishes an end-to-end traffic route for such data. To accomplish this end-to-end route, an admission control process is employed by the resource allocation module 270 to setup a high bandwidth route with sufficient resources allocated to each link in the route. Accordingly, resource allocation is determined when the route is established. Once the route is successfully established, the connection is admitted and data traffic may proceed. If no acceptable route can be established with adequate resources, the route is denied.

Figure 7:
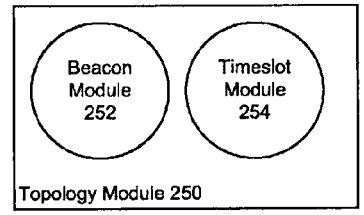
FIG. 7 is a block diagram illustrating an example topology module according to an embodiment of the present invention.

FIG. 7 is a block diagram illustrating an example topology module 250 according to an embodiment of the present invention. In the illustrated embodiment, the topology module 250 comprises a beacon module 252 and a timeslot module 254.

The beacon module 252 is configured to send and receive beacon signals and form the wireless network topology based on information received in the beacon signals from other UWB nodes in the network. Advantageously, the fields and format of the beacon signal can be enhanced to provide additional data that is useful in forming the network topology without introducing any compatibility issues with WiMedia or IEEE 802.15.3 nodes. For example, neighbor node information can be included in the beacon signal as well as signal strength, SNR information, and other useful data.

In one embodiment, when identifying the topology of the network, the beacon module determines the list of neighbor nodes, establishes a reliable high transmission link with each neighbor node, and acquires synchronization with the neighbor nodes. All of these tasks are advantageously performed through beaconing. For example, when a new UWB node joins a network, it receives one or more beacons and checks the signal quality of each. The node sending the beacon signal is added to the neighbor list of the new UWB node and the link quality is examined to determine if a reliable high transmission link can be established. Because the transmission rate in UWB communications is very sensitive to the distance between nodes (and thus the signal strength between nodes) only those links with the highest transmission rate will be set up to ensure the best quality. Otherwise stated, communication between nodes that are too far away or do not have reliable links is carried out by multi-hop mesh networking to deliver packets. It should be noted that, although a link between two nodes is setup with the highest transmission rate, its actual transmission rate may vary depending on the environmental conditions at the time of transmission.

In parallel with building the neighbor list and setting up the link, the new node also acquires synchronization information from the network. This information is obtained from the beacon messages. The synchronization information allows the beacon module to align the superframe of the new node with the superframe of the other nodes in the network. The synchronization information also allows the beacon module to align the beacon period, the contention access period, and the contention free period.

The timeslot module 254 is configured to allocate initial timeslots and interleaved timeslots in the contention free period for the new node. Advantageously, the allocation of initial timeslots allows a new node the resources to send packets prior to the actual allocation of interleaved timeslots in the contention free period. Note that before initial timeslot allocation is done, the new node has to send its information by piggybacking information in a beacon message or sending information during the CAP using unreliable CSMA/CA.

The allocation of initial timeslots is particularly important when admission control is needed to establish a reliable transmission route for high QoS traffic, for example with multimedia applications. The allocation of initial timeslots also allows a new node to send reliable signaling messages including MAC and routing related messages. Additionally, the allocation of initial timeslots allows a new node to assist with the interleaving of timeslots allocated to it.

For example, in TDMA if a consecutive block of timeslots are allocated to a single node, the throughput performance may suffer in a multi-hop network. Accordingly, timeslot module 254 is configured to allocate timeslots in an interleaved fashion. To achieve this, the initial timeslots of each node are uniformly distributed in the entire CFP of the superframe. Later, when more timeslots are allocated by the distributed allocation scheme, they can advantageously be selected from the timeslots that immediately following the initial times lots.

The timeslot module 254 is configured to obtain initial timeslots for the new node that are not in conflict with the timeslots of the other nodes in the network and that are uniformly distributed in the CFP of the superframe. For example, if the number of the initial timeslots for each node is N. In one embodiment, the number of initial timeslots may be implemented as a modifiable system parameter. The number N can also be dynamically determined by assuming that the block size of timeslots (the maximum number of consecutive timeslots allocated to each node) is M; the maximum number of neighbors in the network is K, and total timeslots in the CFP is T, then N=T/(MK).

Once the number of initial timeslots N has been determined, the timeslot module 254 next determines where these initial timeslots can be placed in the CFP for uniform distribution. To determine how best to uniformly distribute the initial timeslots, the new node collects information from neighboring nodes that are up to two-hops away. This information is obtained through beaconing. Based on the collected information, the new node identifies what timeslots have been allocated to its neighbors and selects its initial timeslots from the remaining free timeslots in the CFP. This provides for the initial allocation. The selection process advantageously chooses timeslots that are evenly spaced from each other and separated by other nodes' initial timeslots in order to achieve interleaving and thereby optimal throughput. After the initial timeslots are selected, the new node informs its neighbors within two hops of its reservation of those timeslots. Advantageously, the messages sent to inform neighboring nodes can be sent in the next available initial timeslot. This also provides other new nodes with the timeslot reservation information in order to reduce any conflicts during initial timeslot allocation.

The timeslot module 254 is additionally configured to select timeslots during distributed timeslot allocation for best effort traffic or reliable transmission traffic. As explained before, the initial timeslots are the reference point for selecting additional timeslots in the CFP. In one embodiment, when additional timeslots are allocated to a node, they are selected from the blocks of timeslots following the node's initial timeslots. Since the allocation of initial timeslots is based on topology (e.g., the number of nodes in the network) the number of initial timeslots per node is not optimally distributed—especially when the various nodes have an unbalanced traffic load. For example, one node may have a significant amount of traffic to send while another node may have a very low traffic load. In such a scenario, the high traffic node needs to be assigned more of the timeslots in the CFP. If the blocks of timeslots following the node's initial timeslots do not meet this need, then some of the timeslots assigned to this node can be selected in the blocks of timeslots following other nodes' initial timeslots.

Advantageously, the timeslot module 254 first allocates additional timeslots to a node that all in the blocks that follow the node's initial timeslots because this is most efficient. If additional timeslots are needed, then these timeslots can be reserved from blocks that follow other nodes' initial timeslots.

Figure 8:
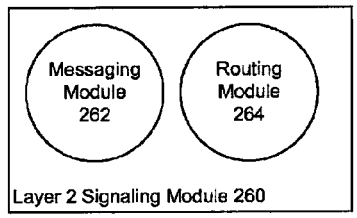
FIG. 8 is a block diagram illustrating an example layer-2 signaling module according to an embodiment of the present invention.

FIG. 8 is a block diagram illustrating an example layer-2 signaling module 260 according to an embodiment of the present invention. In the illustrated embodiment, the signaling module 260 comprises a messaging module 262 and a routing module 264. In one embodiment, the messaging module 262 is configured to handle layer-2 signaling during the initial timeslots, which are those timeslots in the CAP and are allocated such that there is no conflict between transmitting nodes. Thus, signaling messages are sent out with a very high probability of successful delivery. However, because wireless channel errors may still occur, a reliable mechanism is still needed for signaling so that the performance of the layer-2 MAC module is not compromised by unreliable transmission of signaling messages.

In order to accomplish reliable transmission of signaling messages, unicast transmission of signaling messages is implemented by the messaging module 262. For example, when a node needs to send a signaling message to all of its neighbors the messaging module 262 sends the message to each neighbor, one by one, using a unicast message with acknowledgement procedure. While this may appear to increase traffic and introduce delays, the overall effect is actually faster communication because the reliability is guaranteed and less retries are required, for example, when channel quality is poor.

The routing module 264 is configured to identify layer-2 routes for best effort traffic and establish layer-2 routes for reliable transmission traffic. Although the MAC module includes the routing module 264, which is configured to implement layer-2 routing, this layer-2 routing can be turned off as needed. Therefore, it is optional. When layer-2 routing is disabled, the MAC module behaves the same for best effort traffic except that the routing path is setup by the layer 3 routing. Additionally, when layer-2 routing is disabled, the establishing of an end-to-end reliable transmission (admission control), for example for multimedia traffic, is carried out at layer 3. One disadvantage of this is that the route established by layer 3 will likely not provide optimal performance since it is not tied in with resource allocation during setup of the route.

Figure 9:
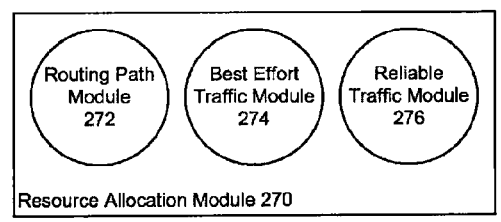
FIG. 9 is a block diagram illustrating an example resource allocation module according to an embodiment of the present invention.

FIG. 9 is a block diagram illustrating an example resource allocation module 270 according to an embodiment of the present invention. In the illustrated embodiment, the resource allocation module 270 comprises a routing path module 272, a best effort traffic module 274, and a reliable transmission traffic module 276.

The routing path module 272 works in cooperation with the best effort traffic module 274 and the reliable traffic module 276 in order to provide on demand routes for best effort traffic and established end-to-end routes for reliable transmission traffic.

The best effort traffic module 274 finds the best routing path on demand for new best effort traffic and performs fair queuing for all best effort traffic flows in each group of neighboring nodes. For example, for best effort data traffic there is no QoS or traffic specification information available for the best effort traffic module 274 to carry out the resource allocation. Thus, there is no need to reserve any timeslots for best effort traffic. Resource allocation for best effort traffic is therefore carried out on demand for all traffic flows rather than per flow.

Once a new traffic flow starts, the best effort traffic module 274 instructs the routing path module 272 to determine the routing path from end to end. In one embodiment, the optimal end to end route can be determined based on minimum hop count and the load of each link Note that link quality does not need to be considered because the previously described topology module operates to ensure that each link is the best available when it is established. Advantageously, excluding link quality from the routing metrics allows the routing path to be setup with higher stability. And additional advantage of considering the traffic load on each link when determining the routing path is that this inherently provides load balancing across the UWB network.

Additionally, the use of layer-2 routing improves performance because all of the signaling messages related to routing are initiated, sent, received, and processed at the MAC layer. Furthermore, because the initial timeslots for reliable layer-2 signaling are reserved, the routing related messages can be sent and received more quickly and reliably, which greatly improves the overall efficiency of the routing protocol, particularly in a multi-hop mesh network environment.

When an on demand routing path is set up, even if load balancing is considered the actual traffic load on each link is not proportional to the number of timeslots allocated to the link The traffic load on each link varies depending on the fluctuation of traffic patterns on different flows. Thus, considering any given link on the routing path, its assigned timeslots may not be enough to handle the required traffic load for a particular flow. Accordingly, the resource allocation module 270 employs a fair resource allocation process that periodically adjusts the resource allocation on each node in the network. In on embodiment, this process is triggered by one node in the network and during execution is passed from one node to the next node when the previous node is done.

During fair resource allocation, at each node the traffic load of best effort traffic to different destinations is estimated and the traffic load and timeslots are compared for different links from this node to its neighbors. The timeslots that are more than the traffic load are then released and reassigned to those links with insufficient timeslots. This adjustment takes place across all nodes in the network so that the best effort traffic resources are fairly distributed amongst the nodes and can provide maximum throughput for best effort traffic.

It should be noted that the available timeslots for best effort traffic are those remaining timeslots that are not reserved for reliable transmission traffic. In one embodiment, in order to avoid a situation where best effort traffic has zero timeslots, each superframe maintains a minimum number of timeslots that are reserved for best effort traffic.

The reliable traffic module 276 is configured to handle traffic with certain throughput requirements, i.e., data flows with QoS and traffic specifications. For these types of high priority data flows, end-to-end admission control is employed by the reliable traffic module 276 to provide end-to-end resource reservation at a level that will meet the QoS specification. Because end-to-end transmission relies on an established routing path, the routing path module is employed to identify the end-to-end routing path for the reliable transmission traffic flow. The reliable traffic module 276 operates based on the use of layer-2 routing for packet delivery. If layer-3 routing is used for packet delivery, then the resources that are reserved on the various end-to-end links between nodes in the network may not be used since the layer-3 routing may select an alternative path for delivery of the packets. Thus, to provide QoS support, the reliable traffic module incorporates both routing and timeslot allocation into the same procedure of end-to-end admission control.

In one embodiment, when a UWB mesh node detects the arrival of a new connection, it first determines the QoS and reliable traffic specification of this connection. Next, the end-to-end admission control process is triggered and includes determining the sequence of nodes in the path (e.g., performed by the routing module 272), reserving timeslots for delivery of packets at each node, and sending a reservation failure message from any node or sending a reservation success message from the end node.

For example, the node initiating the admission control process, first maps the QoS and traffic specification onto the number of required timeslots and determines if there are enough available timeslots. If there are, then the routing path module 272 determines which link should be used for sending the data by considering the minimum hop count to the destination. Once the link is determined, the number of required timeslots is allocated to this link (if any reallocation is needed). All neighbor nodes within two hops are then informed of the timeslot allocation to prevent interference.

This process continues at each node in the routing path until sufficient resources have been allocated at each node in the path to the end node. If any node along the path is unable to allocate the required number of timeslots, that node sends a reservation failure message back to the initiating node. The reservation failure message is also passed along to neighbor nodes within two hops so that they can update the status of any previously allocated timeslots along the reserved path as unallocated. When the reservation failure message reaches the initiating node, that node can inform the higher layer protocol or application protocol that the connection failed due to insufficient resources. Alternatively, if reservation is successful from end-to-end, the end node sends a reservation success message back to the initiating node so that the reliable transmission of data may begin.

Accordingly, the reliable traffic module 274 in cooperation with the routing path module 272 establishes an end-to-end routing path and in doing so also allocates sufficient timeslots on each link. Furthermore, this process is carried out in a distributed fashion that does not require coordination of all nodes in the network. This is different from the previously described fair resource allocation for best effort traffic, where timeslot allocation and/or adjustment is coordinated among all nodes in the network. Thus, the difference between fair resource allocation for best effort traffic and end-to-end reservation for reliable traffic delivery is that the connection setup for reliable traffic is performed based on remaining timeslots while the resource allocation/adjustment for best effort traffic is performed by reassignment of timeslots allocated for best effort traffic among all nodes in the interference range (e.g., two hops).

In one embodiment, when a connection is no longer needed, a teardown process can be started from either end node. The teardown process may be implemented by sending a reservation release message from one end node all the way to the other end node following the established routing path. Each node in the path thereby releases the reserved timeslots for the connection and informs their respective neighbors so that the reserved timeslots are released across the network.

Figure 10:
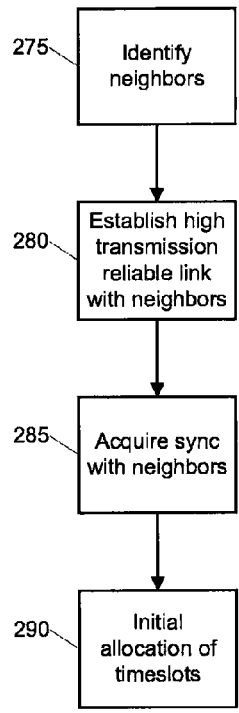
FIG. 10 is a flow diagram illustrating an example process for initializing communications in a wireless network according to an embodiment of the present invention.

FIG. 10 is a flow diagram illustrating an example process for initializing communications in a wireless network according to an embodiment of the present invention. The illustrated process may be carried out by a wireless node in a UWB network, for example the nodes previously described in FIGS. 1, 2, 3, and 6. Initially, in step 275 the node identifies its neighbor nodes. This can be accomplished by receiving and analyzing beacon signals during the beacon period. For those nodes with sufficiently high signal quality, in step 280 the node establishes a high transmission reliable link with each identified neighbor node. Next, in step 285 the node achieves synchronization with the other nodes in the network. This synchronization aligns the superframe of the node with the superframes of the other nodes in the network and aligns the respective beacon periods, contention avoidance periods, and contention free periods. Finally, in step 290 the node allocates its initial timeslots. This is done by determining what timeslots have been allocated by other nodes in the network and then reserving a calculated number of timeslots for the node—with those timeslots being distributed evenly throughout the CFP of the superframe.

Figure 11:
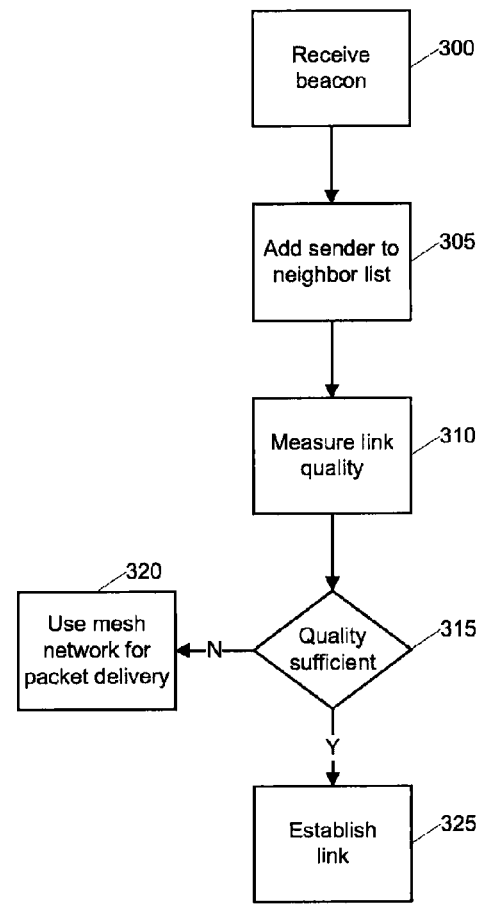
FIG. 11 is a flow diagram illustrating an example process for identifying the topology of a wireless network according to an embodiment of the present invention.

FIG. 11 is a flow diagram illustrating an example process for identifying the topology of a wireless network according to an embodiment of the present invention. The illustrated process may be carried out by a wireless node in a UWB network, for example the nodes previously described in FIGS. 1, 2, 3, and 6. Initially, in step 300 the node receives a beacon signal from another node. Next, in step 305 the node determines who the sender of the beacon signal is and adds that node to the sender list, which can be stored in local data storage on the node. Then in step 310, the node measures the link quality of the beacon signal to determine if the link quality is sufficient for a direct link to be maintained with the node for high bandwidth communication (e.g., UWB communication). If the quality of the link is sufficient, as determined in step 315, then the node establishes a link with the node and updates the neighbor list accordingly. If the quality of the link is poor, then in step 320 the node determines to use the mesh network for delivery of packets to the node that sent the beacon signal and the neighbor list is updated accordingly.

FIG. 12 is a flow diagram illustrating an example process for allocating initial timeslots in a wireless network according to an embodiment of the present invention. The illustrated process may be carried out by a wireless node in a UWB network, for example the nodes previously described in FIGS. 1, 2, 3, and 6. Initially, in step 320 the node collects information from its neighbors within two hops. Collecting the information from the two hop range rather than just the single hop range advantageously allows the node to include those timeslots within interference range in its allocation process. Next, in step 325, the node determines what timeslots are already allocated to nodes in direct communication range (one hope) or nodes in interference range (two hops). As a result, the node is able to identify in step 330 what timeslots are unused. In step 335 the node then selects its initial timeslots, making a point of distributing those timeslots as evenly as possible throughout the contention free period. Once the timeslots have been selected, in step 340 the node informs its neighbors out to the two hop range about the initial timeslots it has allocated to itself. Advantageously, this communication can be sent in the next occurring initial timeslot of the node.

FIG. 13 is a flow diagram illustrating an example process for allocating resources for best effort wireless communication according to an embodiment of the present invention. The illustrated process may be carried out by a wireless node in a UWB network, for example the nodes previously described in FIGS. 1, 2, 3, and 6. Initially, in step 350 the node measures the best effort traffic load on each link and then compares the load to the number of allocated timeslots for each link in step 355. Next, in step 360 the node adjusts the timeslots that are available for best effort traffic so that they are optimized in a fashion that those links with the higher best effort traffic load or estimated best effort traffic load have more timeslots allocated to them than those links with less best effort traffic load or estimated best effort traffic load.

Figure 14:
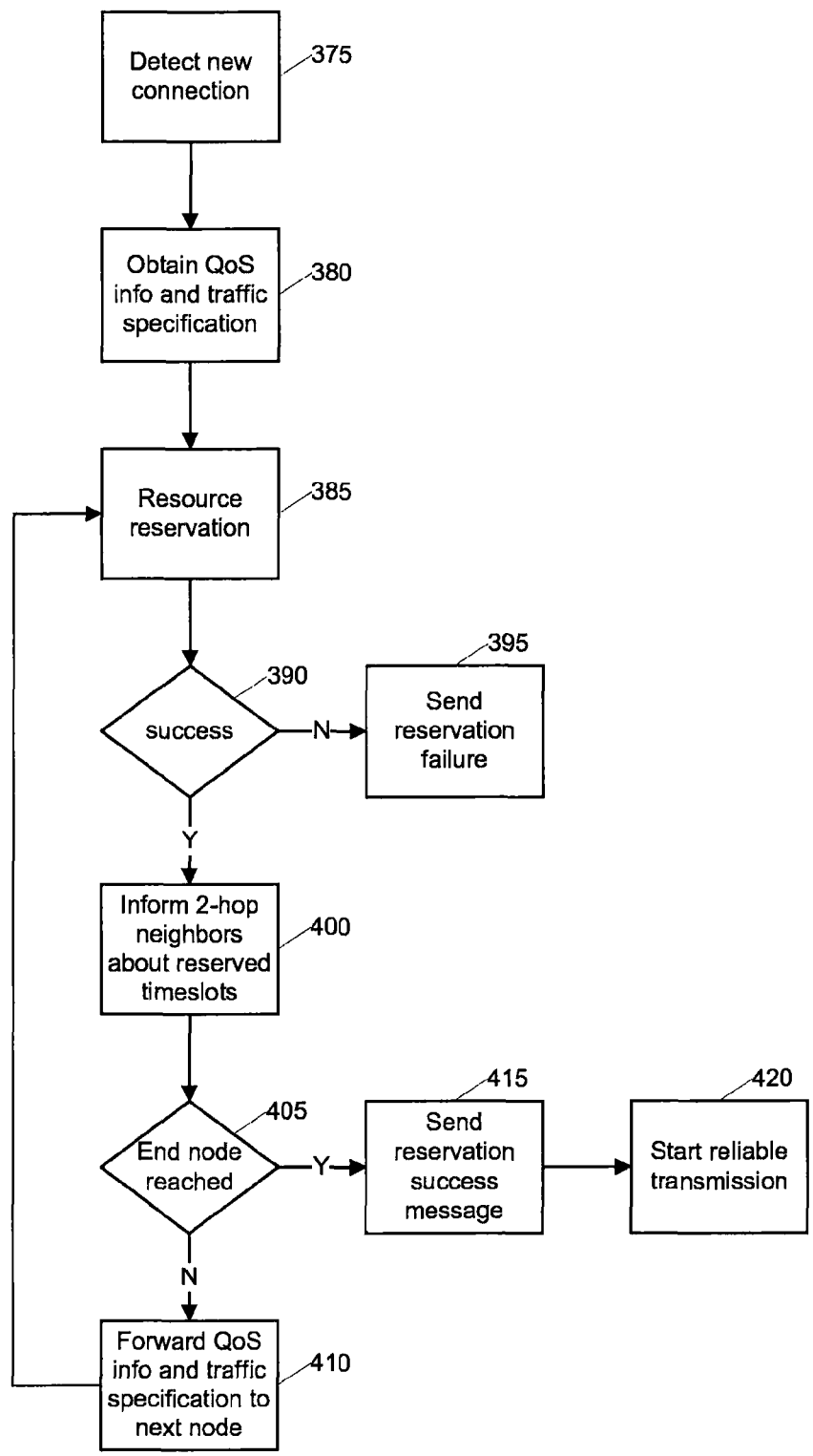
FIG. 14 is a flow diagram illustrating an example process for allocating resources for reliable transmission according to an embodiment of the present invention.

FIG. 14 is a flow diagram illustrating an example process for allocating resources for reliable transmission according to an embodiment of the present invention. The illustrated process may be carried out by a wireless node in a UWB network, for example the nodes previously described in FIGS. 1, 2, 3, and 6. Initially, in step 375, the node detects a new connection or a new traffic flow request from a higher layer in the communication stack. For example an application on the device may request to send a large digital image over the network or request to stream an audio/video file such as a movie trailer or full feature film over the network. For such multimedia applications, reliable transmission is desirable to ensure a level of quality that is acceptable to a user of the wireless device and wireless communication medium such as a UWB communication channel.

Next, in step 380 the node obtains the QoS information and traffic specification required for the reliable transmission. This information may be received from the application or higher layer. In step 385 the node then reserves the necessary resources it needs to meet the QoS level by allocating enough timeslots to the link that will be used to send the traffic to the next node in the communication path between this node and the end node. If the resource allocation is successful, as determined in step 390, then the node informs its neighbors out to two hops about the reserved timeslots, as shown in step 400. If, however, the resource allocation was not successful, in step 395 the node sends a reservation failure to inform the upper layer or application that establishing the reliable transmission path failed.

When the node successfully allocates the resources needed to meet the desired QoS level, then in step 405 the node determines if it is the last node in the path between the first node and the end node. If the end node has not been reached, then in step 410 the QoS information and traffic specification information is sent to the next node in the path and the process of resource reservation begins anew and the next node in the path. In this fashion, all nodes in the path between the first node and the end node advantageously reserve the necessary resources for reliable transmission of data at the desired QoS level. Once the end node is reached, as determined in step 405, then in step 415 the last node sends a reservation success message back to the first node. Upon receipt of the reservation success message, the first node informs the upper layer or application and the reliable transmission may begin, as shown in step 420.

FIG. 15 is a flow diagram illustrating an example process for resource reservation according to an embodiment of the present invention. The illustrated process may be carried out by a wireless node in a UWB network, for example the nodes previously described in FIGS. 1, 2, 3, and 6. The illustrated process can be used, for example, in the context of step 385 previously described with respect to FIG. 14.

Initially, in step 430 the node determines the number of timeslots that are required for the transmission of the data. Next, in step 435 the node identifies the link over which the data will be sent. This can be accomplished by determining the best route to the end node, which can be calculated, for example, based on minimum hop count. Advantageously, each link in the path is already know to be a high quality reliable transmission channel pursuant to the topology formation process previously described with respect to FIG. 11. Once the target link is identified, in step 440 the node then allocates the appropriate number of timeslots to that link to carry the traffic at the desired QoS level.

Figure 16:
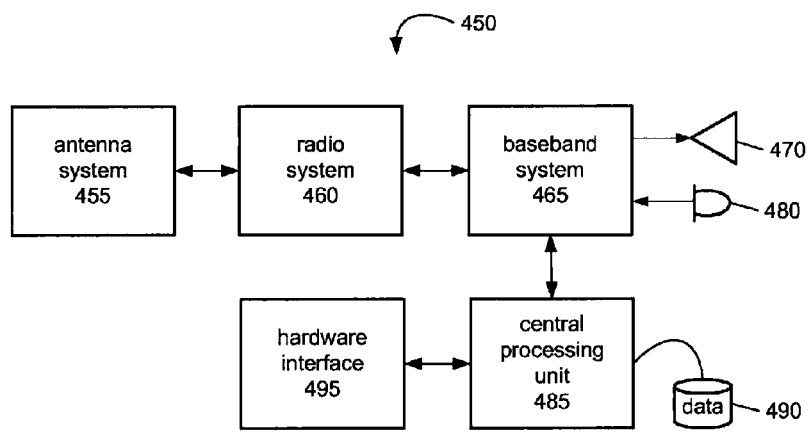
FIG. 16 is a block diagram illustrating an example wireless communication device that may be used in connection with various embodiments described herein.

FIG. 16 is a block diagram illustrating an example wireless communication device 450 that may be used in connection with various embodiments described herein. Other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 6-9.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 17:
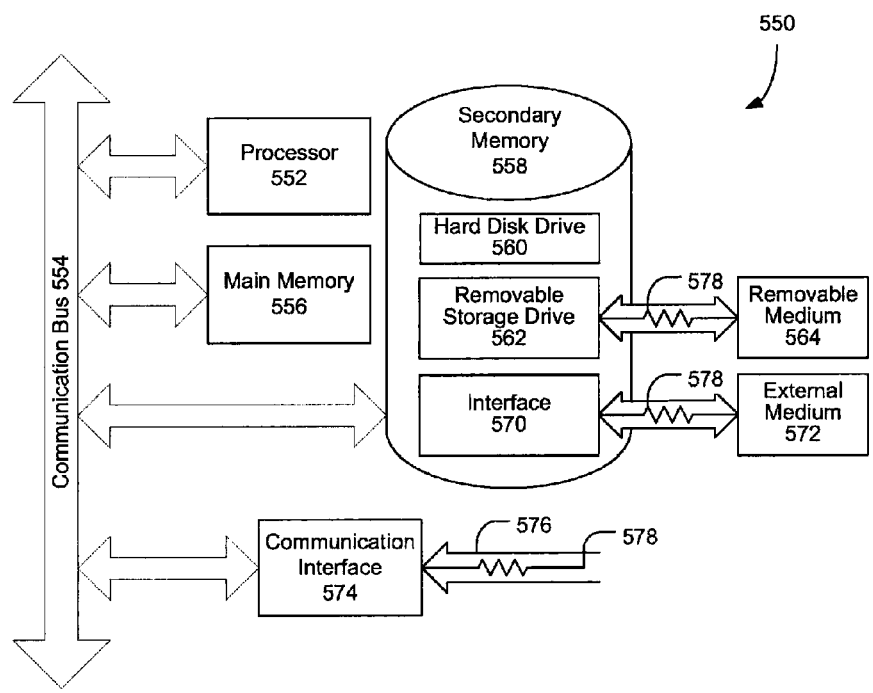
FIG. 17 is a block diagram illustrating an example computer system that may be used in connection with various embodiments described herein.

FIG. 17 is a block diagram illustrating an example computer system 550 that may be used in connection with various embodiments described herein. Other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method comprising:
   receiving a beacon signal from a wireless communication network, wherein the beacon signal includes information about a sender node and network synchronization information;
   adding the sender node to a neighbor list;
   determining a signal quality for the beacon signal from the sender node; and
   establishing a wireless communication link with the sender node if the determined signal quality meets a predetermined threshold quality level.

2. The method of claim 1, further comprising aligning a beacon period based on the network synchronization information.

3. The method of claim 1, further comprising aligning a contention access period based on the network synchronization information.

4. The method of claim 1, further comprising aligning a contention free period with the wireless communication network based on the network synchronization information.

5. The method of claim 1, further comprising adding information corresponding to the wireless communication link to the neighbor list.

6. The method of claim 1, further comprising allocating a plurality of initial timeslots for data communication over the wireless communication network and informing neighboring nodes about the allocated initial timeslots.

7. The method of claim 1, further comprising transmitting the neighbor list during the beacon period.

8. The method of claim 1, further comprising transmitting the neighbor list during a next beacon period.

9. The method of claim 1, further comprising, for at least one respective sender node having a beacon signal quality that does not meet the predetermined threshold quality level, identifying an alternate route to the at least one respective sender node based, at least in part, on paths identified in the neighbor list.

10. An apparatus comprising:
    a communication interface configured to receive a beacon signal from a wireless communication network, wherein the beacon signal includes information about a sender node and network synchronization information;
    a processor configured to:
      add the sender node to a neighbor list;
      determine a signal quality for the beacon signal from the sender node; and
      establish a wireless communication link with the sender node if the determined signal quality meets a predetermined threshold quality level.

11. The apparatus of claim 10, wherein the processor is further configured to align a beacon period based on the network synchronization information.

12. The apparatus of claim 10, wherein the processor is further configured to align a contention access period based on the network synchronization information.

13. The apparatus of claim 10, wherein the processor is further configured to align a contention free period with the wireless communication network based on the network synchronization information.

14. The apparatus of claim 10, wherein the processor is further configured to allocate a plurality of initial timeslots for data communication over the wireless communication network and informing neighboring nodes about the allocated initial timeslots.

15. The apparatus of claim 10, wherein the processor is further configured to transmit the neighbor list during the beacon period.

16. The apparatus of claim 10, wherein the processor is further configured to, for at least one respective sender node having a beacon signal quality that does not meet the predetermined threshold quality level, identify an alternate route to the at least one respective sender node based, at least in part, on paths identified in the neighbor list.

17. An article of manufacture including a non-transitory computer readable medium having instructions stored thereon that, in response to execution by a computing device, cause the computing device to perform operations comprising:
    receiving a beacon signal from a wireless communication network, wherein the beacon signal includes information about a sender node and network synchronization information;
    adding the sender node to a neighbor list;
    determining a signal quality for the beacon signal from the sender node; and establishing a wireless communication link with the sender node if the determined signal quality meets a predetermined threshold quality level.

18. The article of manufacture of claim 17, the operations further comprising aligning a beacon period based on the network synchronization information.

19. The article of manufacture of claim 17, the operations further comprising aligning a contention access period based on the network synchronization information.

20. The article of manufacture of claim 17, the operations further comprising aligning a contention free period with the wireless communication network based on the network synchronization information.

\* \* \* \* \*